United States Patent
Li et al.

(10) Patent No.: US 10,129,071 B2
(45) Date of Patent: Nov. 13, 2018

(54) SYMBOL SYNCHRONIZATION METHOD AND APPARATUS

(71) Applicant: Huawei Technologies Co., Ltd., Shenzhen, Guangdong (CN)

(72) Inventors: Xiaodong Li, Chengdu (CN); Qiao Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/809,126

(22) Filed: Nov. 10, 2017

(65) Prior Publication Data

US 2018/0091352 A1 Mar. 29, 2018

Related U.S. Application Data

(63) Continuation of application No. PCT/CN2015/078767, filed on May 12, 2015.

(51) Int. Cl.
| | |
|---|---|
| *H04L 7/00* | (2006.01) |
| *H04L 27/00* | (2006.01) |
| *H04L 27/26* | (2006.01) |

(52) U.S. Cl.
CPC ........ *H04L 27/2665* (2013.01); *H04L 7/0029* (2013.01); *H04L 27/0014* (2013.01); *H04L 2027/0069* (2013.01)

(58) Field of Classification Search
CPC ... H04L 7/002; H04L 7/0029; H04L 27/0014; H04L 27/2662; H04L 27/2663; H04L 27/2665
See application file for complete search history.

(56) References Cited

U.S. PATENT DOCUMENTS

| | | | | |
|---|---|---|---|---|
| 2006/0098719 A1* | 5/2006 | Baltersee | ............. | H04B 1/7085 375/148 |
| 2009/0022236 A1* | 1/2009 | Liu | ........................ | H04L 7/0029 375/260 |
| 2011/0235762 A1* | 9/2011 | Cochran | ............... | H04L 7/0029 375/354 |

FOREIGN PATENT DOCUMENTS

| | | |
|---|---|---|
| CN | 102065043 A | 5/2011 |
| CN | 103036669 A | 4/2013 |
| CN | 103067069 A | 4/2013 |
| EP | 2615769 A1 | 7/2013 |

(Continued)

OTHER PUBLICATIONS

Awan et al.; "Combined Matched Filter and Arbitrary Interpolator for Symbol Timing Synchronization in SDR Receivers"; 2010 IEEE 13th International Symposium on Design and Diagnostics on Electronic Circuits and Systems (DDECS); Apr. 14-16, 2010; Vienna, Austria; 4 pages.

(Continued)

*Primary Examiner* — David B. Lugo

(57) ABSTRACT

The present disclosure provides a symbol synchronization method and apparatus. By means of the symbol synchronization method and apparatus, a timing location is adjusted outside an adaptive loop. In addition, the adaptive loop proceeds to according to an original function of the adaptive loop. That is, the timing location is stabilized to an initial symbol-synchronization location, and the timing location is then further corrected and adjusted. Therefore, impact of an error of a timing location on symbol synchronization is eliminated by correcting the timing location, and positioning accuracy of a symbol-synchronization location is improved.

9 Claims, 11 Drawing Sheets

(56) References Cited

FOREIGN PATENT DOCUMENTS

| WO | 2008047277 A2 | 4/2008 |
|----|---------------|--------|
| WO | 2010066289 A1 | 6/2010 |
| WO | 2011010259 A2 | 1/2011 |
| WO | 2011095500 A1 | 8/2011 |

OTHER PUBLICATIONS

Fludger et al.; "Jitter tolerant clock recovery for coherent optical receivers"; Optical Fiber Communication Conference and Exposition and the National Fiber Optic Engineers Conference (OFC/NFOEC); Mar. 17-21, 2013; Anaheim, CA, USA; 4 pages.

Gong et al.; "Symbol Timing Recovery Algorithm with Near Timing-jitter Free for ATSC DTV Receivers"; IEEE Transactions on Consumer Electronics; vol. 53, Issue 2; Jul. 9, 2007; 6 pages.

F. Gardner; "Interpolation in Digital Modems—Part I: Fundamentals", IEEE Transactions on Communications; vol. 41 Issue 3; Mar. 1993; 8 pages.

* cited by examiner

SYMBOL SYNCHRONIZATION METHOD AND APPARATUS

CROSS-REFERENCE TO RELATED APPLICATIONS

This application is a continuation of International Application No. PCT/CN2015/078767, filed on May 12, 2015, the disclosure of which is hereby incorporated by reference in its entirety.

TECHNICAL FIELD

The present application relates to the field of wireless communications technologies, and in particular, to a symbol synchronization method and apparatus.

BACKGROUND

In communications technologies, due to a clock offset between a signal transmit end and a signal receive end and a channel transmission delay, signal sampling at the signal receive end cannot be performed at an optimal moment. Consequently, there is an error between collected data and correct data. To compensate for the error, a sampling clock needs to be adjusted or interpolation correction needs to be performed on a sampling value by using a synchronization technology, that is, a symbol synchronization solution at a receive end.

As a symbol synchronization solution, the Gardner symbol synchronization method is a symbol synchronization technology that is most widely used currently. A principle of the method is: A symbol-synchronization location is determined according to a signal waveform characteristic, and a phase of received data is adjusted according to the symbol-synchronization location, so as to compensate for an error that exists between collected data and correct data.

However, with development of technologies such as a multi input multi output (MIMO) technology and an array technology, a case of multiple signals becomes increasingly common. When a receive end of a system receives multiple superimposed signals, signal waveform characteristics of the signals change, so that when symbol-synchronization locations of the multiple superimposed signals are determined by using the existing symbol synchronization solution, positioning accuracy of the symbol-synchronization locations is reduced.

SUMMARY

The present disclosure provides a symbol synchronization method and apparatus, so as to improve positioning accuracy of a symbol-synchronization location.

A first aspect of the present disclosure provides a symbol synchronization method, including:

obtaining a timing error estimation value of input data, where the timing error estimation value indicates a timing error of the input data;

performing high-frequency noise cancellation processing on the timing error estimation value;

obtaining a to-be-corrected interpolation parameter according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location;

performing interpolation filtering on a first branch data stream of the input data according to the to-be-corrected interpolation parameter, so that a to-be-corrected symbol location of a symbol in the first branch data stream of the input data is aligned with the to-be-corrected symbol-synchronization location;

obtaining an adjustment parameter, where the adjustment parameter is used to correct an error of the to-be-corrected interpolation parameter;

correcting the to-be-corrected interpolation parameter according to the adjustment parameter to obtain an interpolation parameter, where the interpolation parameter corresponds to an expected symbol-synchronization location; and performing interpolation filtering on a second branch data stream of the input data according to the interpolation parameter to obtain output data, where an expected symbol location of a symbol of the output data is aligned with the expected symbol-synchronization location.

A second aspect of the present disclosure provides a symbol synchronization apparatus, including a first processor, a first interpolation filter, a loop filter, a second processor and a second interpolation filter, where the first processor is configured to obtain a timing error estimation value of input data, where the timing error estimation value indicates a timing error of the input data;

the loop filter is configured to perform high-frequency noise cancellation processing on the timing error estimation value;

the first processor is further configured to obtain a to-be-corrected interpolation parameter according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location; and the first interpolation filter is configured to perform interpolation filtering on a first branch data stream of the input data according to the to-be-corrected interpolation parameter, so that a to-be-corrected symbol location of a symbol in the first branch data stream of the input data is aligned with the to-be-corrected symbol-synchronization location; and the second processor is configured to:

obtain an adjustment parameter, where the adjustment parameter is used to correct an error of the to-be-corrected interpolation parameter; and correct the to-be-corrected interpolation parameter according to the adjustment parameter to obtain an interpolation parameter, where the interpolation parameter corresponds to an expected symbol-synchronization location; and the second interpolation filter is configured to perform interpolation filtering on a second branch data stream of the input data according to the interpolation parameter to obtain output data, where an expected symbol location of a symbol of the output data is aligned with the expected symbol-synchronization location.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
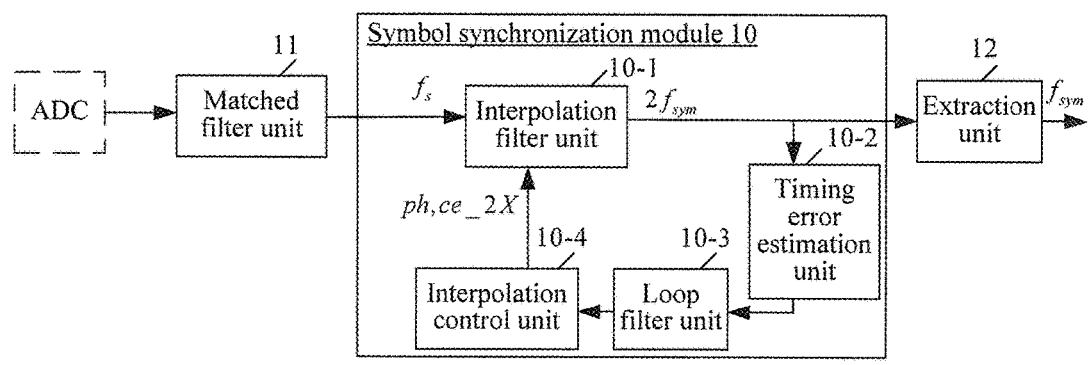
FIG. 1 is a schematic structural diagram of a symbol synchronization module for estimating a timing error by using the Gardner algorithm provided in the prior art.

FIG. 1 is a schematic structural diagram of a symbol synchronization module for estimating a timing error by using the Gardner algorithm provided in the prior art. The symbol synchronization module may be disposed in receiving systems of both parties of digital communication, and the receiving systems may be base stations, hotspot devices, relay devices, or the like. Referring to FIG. 1, a symbol synchronization module 10 mainly consists of four parts: an interpolation filter unit 10-1, a timing error estimation unit 10-2, a loop filter unit 10-3, and an interpolation control unit 10-4.

The timing error estimation unit 10-2 is configured to obtain a timing error estimation value based on the Gardner algorithm.

Specifically, the timing error estimation value is used to indicate a timing error between a symbol location in input data and a to-be-corrected symbol location of a symbol in the input data.

The loop filter unit 10-3 is configured to cancel impact of high-frequency noise on the timing error estimation value, thereby improving stability of a loop, and obtaining a relatively accurate timing error estimation value.

The loop consists of the interpolation filter unit 10-1, the timing error estimation unit 10-2, the loop filter unit 10-3, and the interpolation control unit 10-4.

The interpolation control unit 10-4 is configured to obtain a to-be-corrected interpolation parameter according to the timing error estimation value.

The interpolation filter unit 10-1 (or referred to as an interpolation filter) is configured to perform interpolation on the input data according to the to-be-corrected interpolation parameter output by the interpolation control unit 10-4.

Specifically, the interpolation filter unit 10-1 is essentially configured to implement phase adjustment of the input data. The phase adjustment is reflected as an overall movement in a data waveform, so that an objective of symbol synchronization or symbol timing is implemented. That is, the interpolation filter unit 10-1 is configured to implement a delay of a fractional multiple of a symbol period on the data waveform. The to-be-corrected interpolation parameter is used to indicate a specific value of a delay amount of the fractional multiple.

The interpolation filter unit 10-1 may be implemented by using a finite impulse response (FIR) filter. To implement a fractionally spaced delay, a theoretical model of the interpolation filter unit 10-1 may be considered as convolution of data and a reconstructed function. The reconstructed function is a Sinc function. A filter coefficient is derived from sampling values on a Sinc waveform. Sampling values on the Sinc waveform of different delay amounts are used for the filter coefficient. After convolution, different degrees of fractionally spaced delays of the data waveform may be implemented.

Optionally, a matched filter unit 11 and an extraction unit 12 may be arranged in a symbol synchronization structure. Moreover, in addition to the connection structure shown in FIG. 1, the matched filter unit 11 may further be disposed behind the interpolation filter unit 10-1, and implementation of the prior art is not affected. It should be noted that down-sampling is implemented by the extraction unit 12, that is, data on which symbol synchronization has been performed is down-sampled to a symbol rate of a transmit end. Further, it is required by the Gardner algorithm that one symbol has two sampling points. Therefore, the symbol synchronization module 10 needs to operate under a clock of at least two times of the symbol rate.

Further, during a specific implementation, the to-be-corrected interpolation parameter output by the interpolation control unit 10-4 includes a symbol indicator "ce_2X" and an interpolation phase "ph". Before the interpolation control unit 10-4 performs, based on the to-be-corrected interpolation parameter, interpolation on the input data, a two-dimensional lookup table needs to be looked up according to ph, so as to obtain a corresponding filter coefficient and a filter order. The filter coefficient and the filter order correspond to a filter used by the interpolation filter unit 10-1. In addition, there may be multiple filter coefficients. The filter coefficients are sent to the interpolation filter unit 10-1, so that the interpolation filter unit 10-1 performs interpolation on the data according to the filter coefficients. Further, the two-dimensional lookup table includes M rows and N columns. M is a step obtained by dividing one symbol period (for example, one symbol period is divided into 1024 pieces, so that M=1024), and corresponds to a resolution rate of a fractionally spaced delay. N is the filter order (for example, N=10). The filter order corresponds to the filter used by the interpolation filter unit 10-1.

Further, generally, a value range of the interpolation phase ph output by the interpolation control unit 10-4 is 0≤ph<1 Therefore, before the two-dimensional lookup table is looked up, first, the ph value is multiplied by M, the ph value obtained is rounded to obtain a search value m, and the two-dimensional lookup table is then looked up according to the search value m. A value range of the search value m is 1≤m≤M.

Meanings and characteristics of the symbol indicator ce_2X and the interpolation phase ph output by the interpolation control unit 10-4 are described emphatically below.

The Gardner algorithm requires that each symbol needs to have two sampling points. Therefore, the symbol synchronization module 10 needs to operate under a clock of at least two times of the symbol rate. Referring to FIG. 1, generally, a data sampling rate $f_s$ is slightly greater than two times of the symbol rate $2f_{sym}$ (for example $f_s$=100 M, and $f_{sym}$=49.5 M). After the interpolation filter unit 10-1 completes conversion $f_s \rightarrow 2f_{sym}$ of the data sampling rate of the input data, the extraction unit 12 performs down-sampling of two times of the symbol rate on the input data to obtain input data of the symbol rate. The interpolation filter unit 10-1 needs to operate under enabling of data identified by two times of the symbol rate, and that is the meaning of ce_2X. ce_2X and ce_1X appear in a twofold relationship (using a waveform as an example: ce_1x: 000100010001, so that ce_2X: 010101010101).

After the loop converges and becomes stable, two times of the symbol rate enable ce_2X, so that the interpolation filter unit 10-1 identifies data, of two times of the symbol rate, corresponding to the input data. In the identified data, one is a sampling point of the symbol of the input data, and the other is a sampling point between every two symbols in the input data.

Further, the interpolation phase ph indicates a needed size of a delay amount of a waveform of the input data, and generally, the value range of ph is 0≤ph<1. When the loop converges and becomes stable, the ph value is a series of values that change by an equal amount.

Figure 2:
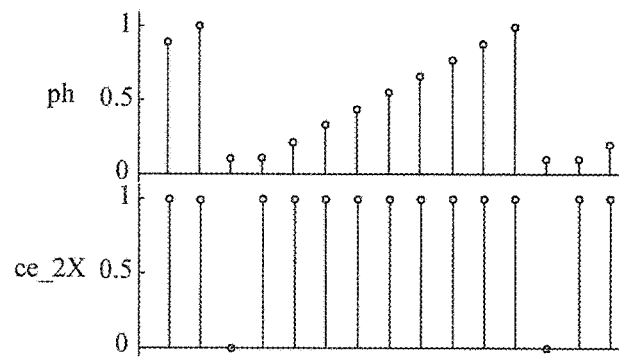
FIG. 2 is a schematic diagram of a relationship between an interpolation phase ph and a symbol indicator ce_2x.

An interpolation filtering operation is performed when the interpolation filter unit 10-1 operates under two times of the symbol clock ce_2X and ce_2X is at a high order, and remains unchanged when ce_2X is at a low order. FIG. 2 is a schematic diagram of a relationship between an interpolation phase ph and a symbol indicator ce_2x. Referring to FIG. 2, with reference to simulation, a waveform of the to-be-corrected interpolation parameter when $f_s$=100 M and $f_{sym}$=45 M is provided for intuitive understanding. ph changes cumulatively when corresponding ce_2X is at a high order, and remains unchanged when ce_2X is at a low order.

For example, at a moment 1, when ce_2X is at a high order 1, a corresponding ph is 0.5. In this case, the two-dimensional lookup table described above is looked up according to ph=0.5 to obtain a filter order, and a corresponding filter coefficient is determined. At a moment 2, when ce_2X is at a high order 1, a corresponding ph is 0.51. In this case, the two-dimensional lookup table described above is looked up according to ph=0.51 to obtain a filter order, and a corresponding filter coefficient is determined. If ce_2X is at a high order 1 at all subsequent consecutive moments, ph keeps increase gradually. At a moment 3, when ce_2X is at a low order 0, because the interpolation filter unit 10-1 is enabled only when ce_2X is at a high order, the interpolation filter unit 10-1 is not enabled when ce_2X is at a low order, and ph remains unchanged.

It should be noted that the reason why ce_2X and ph are reflected in forms of the figures above is details of internal operations of the interpolation control unit 10-4, and the details are not described herein. In this embodiment of the present disclosure, only processing of ce_2X and ph output by the interpolation control unit 10-4 are involved, that forms of original ce_2X and ph remain unchanged is not involved. Only the forms of ce_2X and ph and a mutual relationship between ce_2X and ph are described herein, to facilitate following detailed description of this embodiment of the present disclosure.

Generally, it may be considered that a waveform of a communication signal roughly satisfies a waveform characteristic of positive and negative alternation. By using the existing symbol synchronization technology, symbol-synchronization locations obtained by using the Gardner algorithm are locked at peak and trough locations of the waveform of the signal, that is, "points of maximum energy". In conclusion, in the existing symbol synchronization technology, energy of the signal is detected and tends to be synchronized to the "points of the maximum energy" of a received signal. In a scenario in which multiple signals are superimposed and input (a scenario in which multiple signals are superimposed, for example, a case in which a relative delay occurs among multiple channels of a phased array and among multiple MIMO channels), superimposition of multiple signals has changed waveform characteristics of the signals, and an expected signal is affected by energy of a signal other than the expected signal. As a result, a symbol-synchronization location adjusted by the symbol synchronization module 10 shown in FIG. 1 probably may not be a symbol-synchronization location of the expected signal. Consequently, when symbol positioning is performed on received data of the multiple superimposed signals by using the timing location where an existing symbol synchronization loop converges, because an error caused by the superimposition of the multiple signals cannot be corrected, accuracy of a timing location is reduced. As a result, a positioning error is left in another module at a rear end of the symbol synchronization module 10.

For the foregoing problems that exist in the existing symbol synchronization technology, current solutions are as follows. Consistency of multiple channels is ensured by using hardware. Alternatively, a positioning error is left in another module at a rear end of the symbol synchronization module 10, and a manner such as processing of fractionally spaced equalization is used in the another module at the rear end. In a manner of eliminating a timing error by using hardware, a hardware cost is increased and there is always an offset in timing effects. In a manner of fractionally spaced equalization, a relatively large number of logical resources are occupied, resulting in a waste of logical resources.

For the foregoing technical problems, the embodiments of the present disclosure provide a symbol synchronization method and an apparatus. Principles of resolving the foregoing technical problems are as follows: A first principle is to make a symbol-synchronization location controllable. Referring to the prior art shown in FIG. 1, it may be known that a loop in the existing symbol synchronization technology is an adaptive loop that is difficult to perform intervention and control, resulting in that a timing error of the symbol-synchronization location is uncontrollable. Therefore, the embodiments of the present disclosure provide a mechanism to implement adjustment of the timing location outside the adaptive loop. In addition, the adaptive loop proceeds to process according to an original function of the adaptive loop, that is, timing is stabilized at an initial symbol-synchronization location. The timing location is further corrected and adjusted by using the initial symbol-synchronization location as a basis, thereby making a timing location controllable.

A final objective of the present disclosure is to synchronize a symbol of input data to an expected symbol-synchronization location. Therefore, after a controllable timing location is implemented, a next step is how to obtain the expected symbol-synchronization location and correct a to-be-corrected symbol-synchronization location to the expected symbol-synchronization location. Specifically, the expected symbol-synchronization location is determined by detecting a performance parameter of demodulated data and selecting a performance parameter having optimal performance. How to determine the expected symbol-synchronization location is described in detail below and is not described herein again.

In conclusion, by using the solutions provided in the present disclosure, a timing error caused in a scenario in which multiple signals are superimposed in the existing symbol synchronization technology is avoided, and no additional hardware design is needed to correct the timing error, so that a design cost of hardware is reduced. Moreover, no additional module is needed to correct a timing error by using a manner of fractionally spaced equalization, thereby saving logical development resources.

A symbol synchronization method and apparatus provided in the present disclosure are described in detail by means of specific embodiments.

Figure 3:
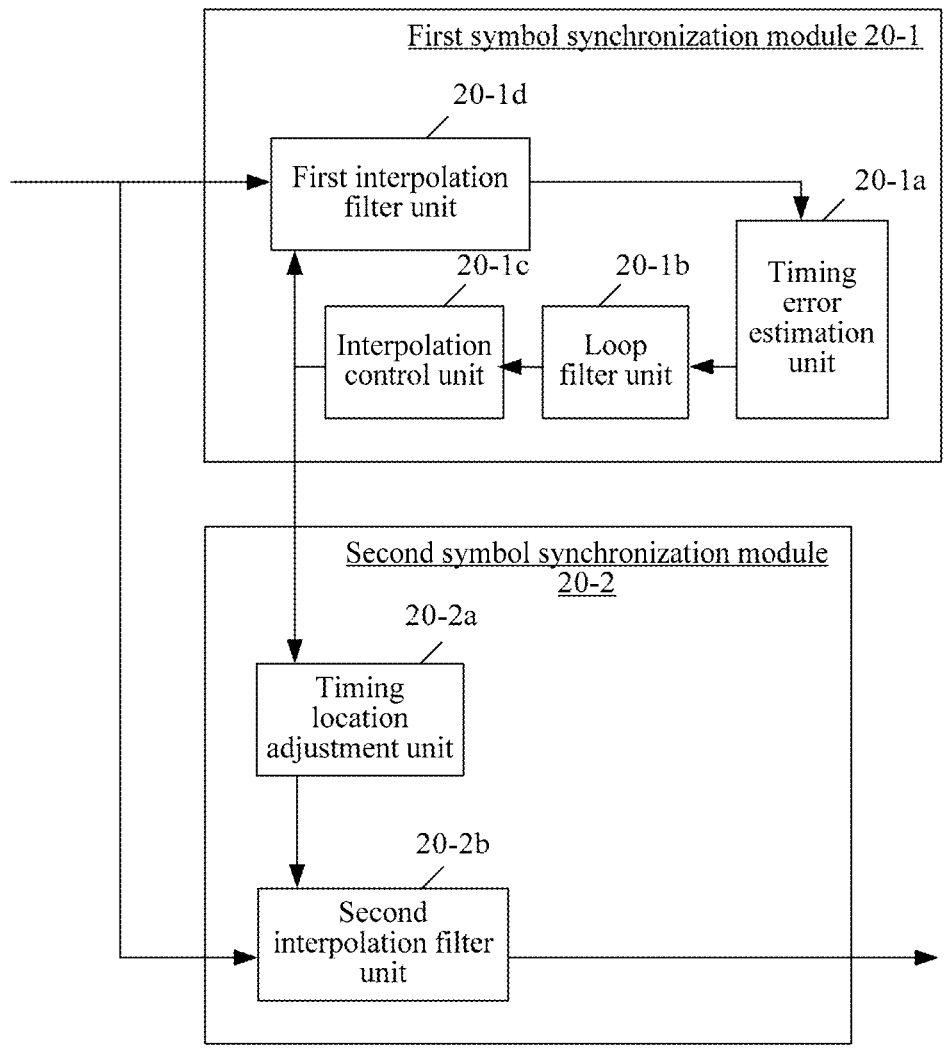
FIG. 3 is a schematic structural diagram of a symbol synchronization apparatus according to an embodiment of the present disclosure.

FIG. 3 is a schematic structural diagram of a symbol synchronization apparatus according to an embodiment of the present disclosure. Referring to FIG. 3, the symbol synchronization apparatus 20 includes a first symbol synchronization module 20-1 and a second symbol synchronization module 20-2.

The first symbol synchronization module 20-1 includes: a timing error estimation unit 20-1a, a loop filter unit 20-1b, an interpolation control unit 20-1c, and a first interpolation filter unit 20-1d.

The timing error estimation unit 20-1a is configured to obtain a timing error estimation value of input data, where the timing error estimation value indicates a timing error of the input data.

The loop filter unit 20-1b is configured to perform high-frequency noise cancellation processing on the timing error estimation value.

The interpolation control unit 20-1c is configured to obtain a to-be-corrected interpolation parameter according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location.

The first interpolation filter unit 20-1d is configured to perform interpolation filtering on a first branch data stream of the input data according to the to-be-corrected interpolation parameter, so that a to-be-corrected symbol location of a symbol in the first branch data stream of the input data is aligned with the to-be-corrected symbol-synchronization location.

The timing error estimation unit 20-1a, the loop filter unit 20-1b, the interpolation control unit 20-1c, and the first interpolation filter unit 20-1d form a loop. A function of the loop is similar to that of the symbol synchronization module shown in FIG. 1.

The second symbol synchronization module 20-2 includes a timing location adjustment unit 20-2a and a second interpolation filter unit 20-2b.

The timing location adjustment unit 20-2a is configured to:

obtain an adjustment parameter, where the adjustment parameter is used to correct an error of the to-be-corrected interpolation parameter; and correct the to-be-corrected interpolation parameter according to the adjustment parameter to obtain an interpolation parameter, where the interpolation parameter corresponds to an expected symbol-synchronization location.

The second interpolation filter unit 20-2b is configured to perform interpolation filtering on a second branch data stream of the input data according to the interpolation parameter to obtain output data, where an expected symbol location of a symbol of the output data is aligned with the expected symbol-synchronization location.

Specifically, referring to FIG. 3, it may be known that an improvement has been made on the interpolation control unit 20-1c of the first symbol synchronization module 20-1 in this embodiment of the present disclosure. That is, output of the interpolation control unit 20-1c is divided into two outputs: In a first output, the to-be-corrected interpolation parameter is output to the first interpolation filter unit 20-1d, so as to ensure adaptive convergence of a loop that consists of the first symbol synchronization module 20-1, to make a characteristic of the to-be-corrected interpolation parameter output by the interpolation control unit 20-1c stability. In a second output, the to-be-corrected interpolation parameter is output to the timing location adjustment unit 20-2a, the timing location adjustment unit 20-2a corrects a phase of the to-be-corrected interpolation parameter to obtain an interpolation parameter, and the second interpolation filter unit 20-2b performs interpolation filtering on the second branch data stream of the input data by using the interpolation parameter, so that a symbol-synchronization location changes compared with that of the first output. That is, an objective of making a timing location controllable mentioned above is achieved, and subsequent demodulation is performed on this basis.

It should be noted that the interpolation control unit 20-1c may send the to-be-corrected interpolation parameter to the timing location adjustment unit 20-2a after adaptive convergence of the loop in the first symbol synchronization module 20-1. Alternatively, the interpolation control unit 20-1c may directly send the obtained to-be-corrected interpolation parameter to the timing location adjustment unit 20-2a without considering adaptive convergence. The two manners are not limited in this embodiment of the present disclosure.

According to the symbol synchronization apparatus provided in this embodiment of the present disclosure, the timing error estimation unit obtains a timing error estimation value of input data, where the timing error estimation value indicates a timing error of the input data; the loop filter unit performs high-frequency noise cancellation processing on the timing error estimation value; the interpolation control unit obtains a to-be-corrected interpolation parameter according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location; the first interpolation filter unit performs interpolation filtering on a first branch data stream of the input data according to the to-be-corrected interpolation parameter, so that a to-be-corrected symbol location of a symbol in the first branch data stream of the input data is aligned with the to-be-corrected symbol-synchronization location; the timing location adjustment unit obtains an adjustment parameter, where the adjustment parameter is used to correct an error of the to-be-corrected interpolation parameter; the timing location adjustment unit corrects the to-be-corrected interpolation parameter according to the adjustment parameter to obtain an interpolation parameter, where the interpolation parameter corresponds to an expected symbol-synchronization location; and the second interpolation filter unit performs interpolation filtering on a second branch data stream of the input data according to the interpolation parameter to obtain output data, where an expected symbol location of a symbol of the output data is aligned with the expected symbol-synchronization location. Therefore, the expected symbol location of the symbol of the output data is aligned with the expected symbol-synchronization location, so that in a scenario in which multiple signals are superimposed, impact of an error of a timing location on symbol synchronization is eliminated by correcting the timing location, and positioning accuracy of a symbol-synchronization location is improved.

Optionally, the to-be-corrected interpolation parameter includes a first symbol indicator and a first interpolation phase.

The first symbol indicator is used to: identify, at a high order, a sampling point of the symbol in the first branch data stream of the input data and a sampling point between every two symbols in the first branch data stream of the input data; and identify, at a low order, a sampling point other than the sampling point of the symbol in the first branch data stream of the input data and the sampling point between every two symbols in the first branch data stream of the input data.

The first interpolation phase is used as an input amount of interpolation filtering performed on the first branch data stream of the input data, so that the to-be-corrected symbol-synchronization location is aligned with the to-be-corrected symbol location of the symbol in the first branch data stream of the input data; and a value range of the first interpolation phase is [0,1].

When the first symbol indicator is at a high order, the first interpolation phase changes gradually by an equal amount; or when the first symbol indicator is at a low order, the first interpolation phase remains unchanged.

Optionally, the adjustment parameter includes an adjustment amount n and a delay-enabling amount ce_dly. How to obtain the adjustment parameter is described in detail below.

The adjustment parameter is obtained based on the expected symbol-synchronization location. Therefore, the expected symbol-synchronization location needs to be obtained first.

Figure 4:
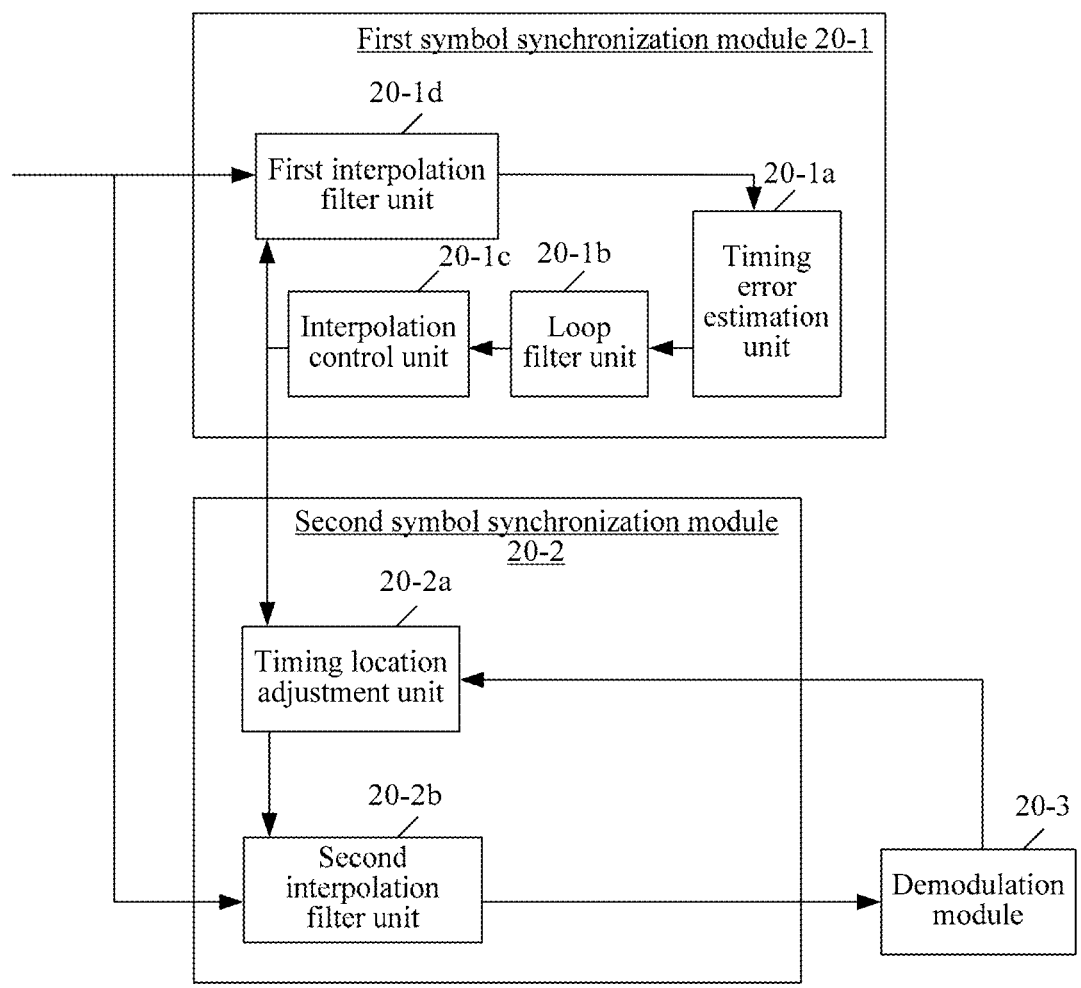
FIG. 4 is a schematic structural diagram of another symbol synchronization apparatus according to an embodiment of the present disclosure.

Based on FIG. 3, FIG. 4 is a schematic structural diagram of another symbol synchronization apparatus according to an embodiment of the present disclosure. Referring to FIG. 4, the symbol synchronization apparatus 20 further includes a demodulation module 20-3.

The demodulation module 20-3 is configured to:

demodulate the output data to obtain a performance parameter set, where the performance parameter set includes at least two performance parameters;

compare any two performance parameters in the performance parameter set sequentially to obtain a performance parameter having optimal performance in the performance parameter set, where the performance parameter having optimal performance corresponds to the expected symbol-synchronization location; where the adjustment parameter includes an adjustment amount n and a delay-enabling amount ce_dly;

determine n according to the performance parameter having optimal performance; and after the demodulation module 20-3 determines n, send n to the timing location adjustment unit 20-2a.

Specifically, for each symbol-synchronization location, the demodulation module 20-3 performs demodulation processing on the output data to obtain a performance parameter, for example, a mean square error (MSE), corresponding to each symbol-synchronization location; traverses an entire symbol period in this way to obtain the performance parameter set; and compares any two performance parameters in the performance parameter set sequentially to obtain an optimal value. The performance parameter corresponds to the expected symbol-synchronization location.

To determine the adjustment parameter according to the expected symbol-synchronization location, first, the timing location adjustment unit 20-2a needs to obtain the expected symbol-synchronization location. The demodulation module 20-3 determines the expected symbol-synchronization location by means of a method of traversing an entire or partial symbol period and detecting demodulation performance.

Specifically, a symbol period [0,1] is used as an example. It is assumed that a to-be-corrected symbol-synchronization location determined by the first symbol synchronization module 20-1 described above is 0.43. If system demodulation performance obtained by the demodulation module 20-3 is relatively desirable, it may be determined that the expected symbol-synchronization location is near the to-be-corrected symbol-synchronization location 0.43. Therefore, instead of performing traversal and detection in the entire symbol period ([0,1]), the to-be-corrected symbol-synchronization location may be adjusted mainly near 0.43 (such as an interval [0.43−0.2, 0.43+0.2]). Further, the demodulation module 20-3 obtains, based on the expected symbol-synchronization location, a performance parameter corresponding to the expected symbol-synchronization location. Further, in a manner, the demodulation module 20-3 determines, based on the performance parameter, the adjustment amount n, and sends the adjustment amount n to the timing location adjustment unit 20-2a. In another manner, the demodulation module 20-3 sends the expected symbol-synchronization location to the timing location adjustment unit 20-2a, and the timing location adjustment unit 20-2a determines the adjustment amount n according to the expected symbol-synchronization location.

That the timing location adjustment unit 20-2a obtains the adjustment parameter specifically includes:

receiving n sent by the demodulation module;

obtaining, according to the first symbol indicator, a period $T_{ce}$ corresponding to the first symbol indicator; and obtaining ce_dly according to a filter order N, $T_{ce}$, and n, where ce_dly satisfies the following formula:

$$\text{ce\_dly} = T_{ce} - \text{round}\left(\frac{n}{N/T_{ce}}\right),$$

where a value range of n is $1 \leq n \leq N$.

Optionally, the interpolation parameter includes a second symbol indicator and a second interpolation phase, and a value range of the second interpolation phase is [0,1]; and the correcting the to-be-corrected interpolation parameter according to the adjustment parameter to obtain an interpolation parameter includes:

performing delay processing on the first symbol indicator according to ce_dly to obtain the second symbol indicator; and correcting the first interpolation phase according to n to obtain the second interpolation phase, where the second symbol indicator is used to: identify, at a high order, a sampling point of a symbol in the second branch data stream of the input data and a sampling point between every two symbols in the second branch data stream of the input data; and identify, at a low order, a sampling point other than the sampling point of the symbol in the second branch data stream of the input data and the sampling point between every two symbols in the second branch data stream of the input data;

the second interpolation phase is used as an input amount of interpolation filtering performed on the second branch data stream of the input data; and a value range of the second interpolation phase is [0,1]; and When the second symbol indicator is at a high order, the second interpolation phase changes gradually by an equal amount; or when the second symbol indicator is at a low order, the second interpolation phase remains unchanged.

Figure 5:
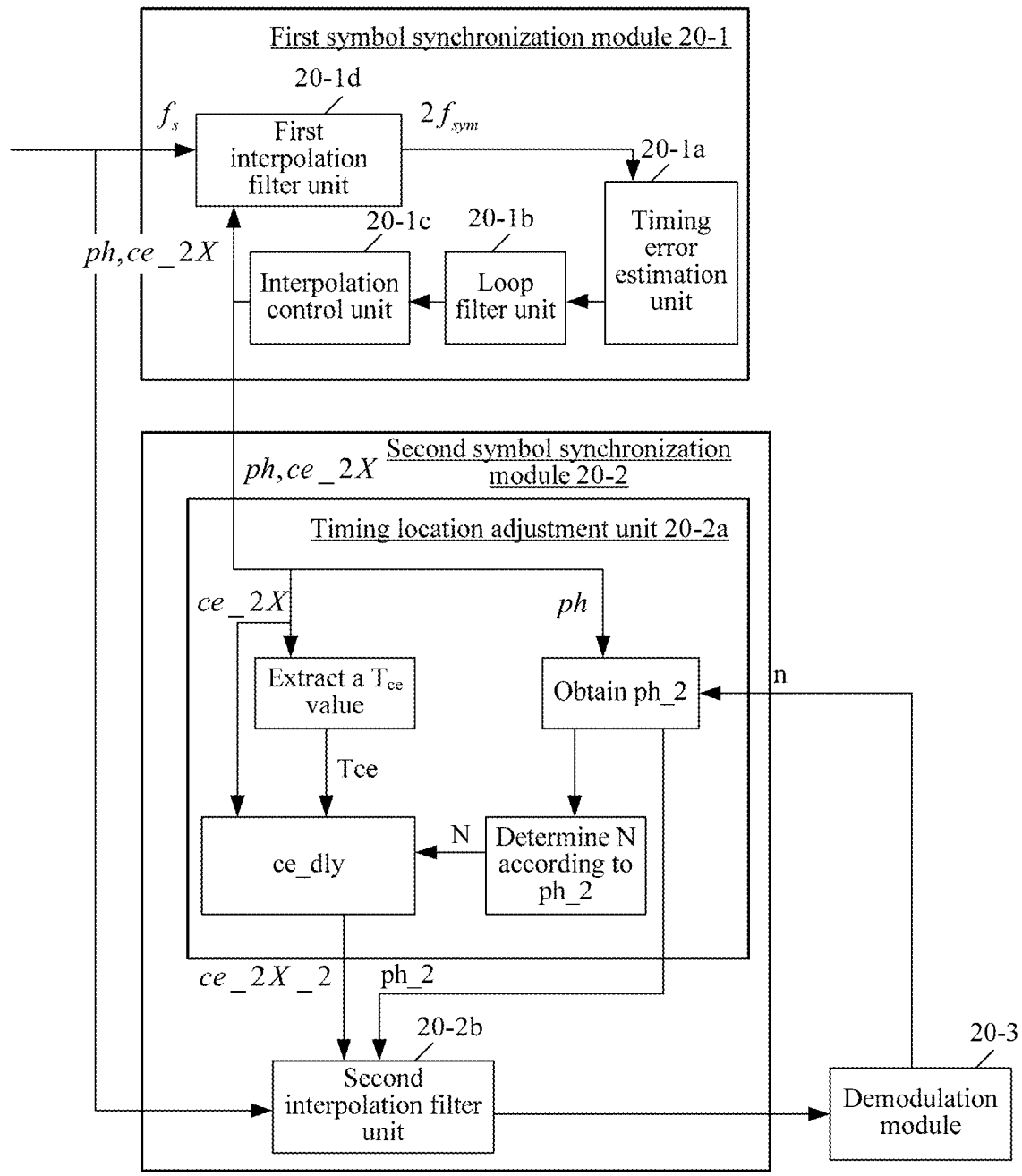
FIG. 5 is a schematic diagram of a processing process of a symbol synchronization apparatus according to an embodiment of the present disclosure.

Based on FIG. 4, FIG. 5 is a schematic diagram of a processing process of a symbol synchronization apparatus according to an embodiment of the present disclosure. Referring to FIG. 5, the function of the timing location adjustment unit 20-2a is specifically described: After the interpolation control unit 20-1c sends ph and ce_2X to the timing location adjustment unit 20-2a, the timing location adjustment unit 20-2a extracts $T_{ce}$ based on ce_2X. $T_{ce}$ is a period of a waveform of ce_2X. A second interpolation phase ph_2 is obtained based on ph and an adjustment amount n sent by the demodulation module 20-3. Further, 0-to-1-wrap-processing needs to be performed on ph_2. Wrap (0,1) means that +1*N or −1*N is performed on input data to keep output data in an interval [0,1]. For example, the input data is: 1.2, 3.1, −0.8, and after wrap (0,1) is performed, the output data is: 0.2, 0.1, 0.2. After the wrap processing, a value range of ph_2 satisfies $0 \leq \text{ph\_2} < 1$, a search value m is determined according to ph_2, and a same two-dimensional lookup table is looked up according to the search value m to obtain N and a filter coefficient. ce_dly is then determined according to N, $T_{ce}$, and ce_2X, so that delay processing is performed on a ce_2X signal according to ce_dly to obtain ce_2X_2, and ce_2X_2 and ph_2 satisfy an alignment relationship.

Specifically, a value of $T_{ce}$ may be obtained by means of values of $f_s$ and $2f_{sym}$, and is a value of a numerator of $$\frac{f_s}{2f_{sym}}$$

when the numerator and a denominator of $$\frac{f_s}{2f_{sym}}$$

are both integers and are both irreducible (having no common divisor). For example, $f_s$=100 M, and $f_{sym}$=49.5 M, so that $T_{ce}$=100. For another example, $f_s$=100 M, and $f_{sym}$=45 M, so that $T_{ce}$=10.

Figure 6:
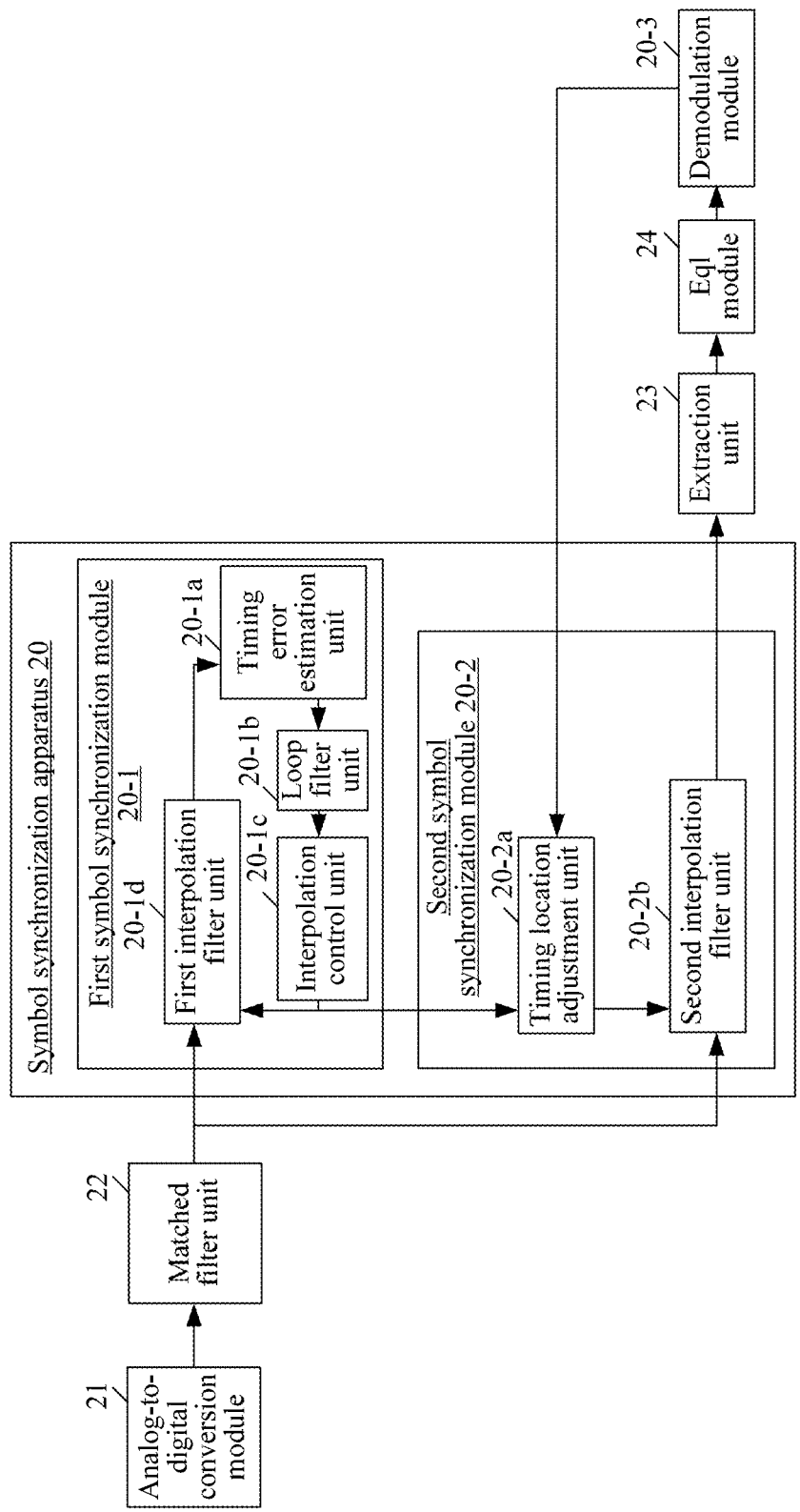
FIG. 6 is a schematic structural diagram of a receive end device according to an embodiment of the present disclosure.

Based on FIG. 4, FIG. 6 is a schematic structural diagram of a receive end device according to an embodiment of the present disclosure. The symbol synchronization apparatus shown in FIG. 4 above is disposed in the receive end device. Referring to FIG. 6, the receive end device includes: a symbol synchronization apparatus 20, an analog-to-digital conversion module 21, a matched filter unit 22, an extraction unit 23, and an equalization (Eql) module 24.

Referring to FIG. 6, the first interpolation filter unit 20-1d is connected to the matched filter unit 22, and the matched filter unit 22 is connected to the analog-to-digital conversion module 21. Optionally, the matched filter unit 22 may be disposed in the first symbol synchronization module 20-1. Specifically, after the matched filter unit 21 is disposed in the second interpolation filter unit 20-1d, a specific connection relationship is not limited in this embodiment of the present disclosure.

The extraction unit 23 is configured to down-sample the symbol-synchronized input data to a symbol rate of a transmit end.

The Eql module 24 is configured to correct a transmission channel amplitude frequency characteristic and a phase frequency characteristic of the symbol-synchronized input data.

Figure 7:
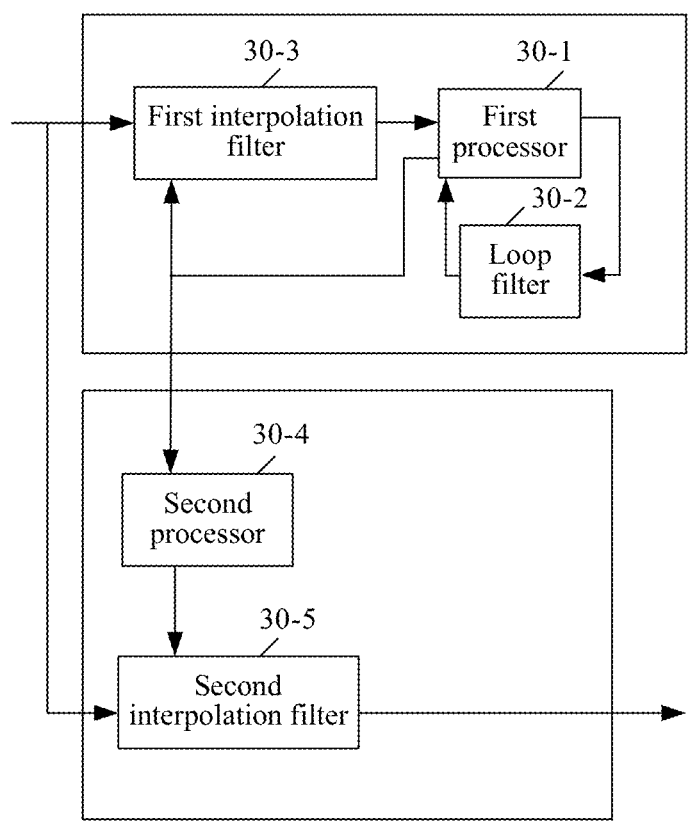
FIG. 7 is a schematic structural diagram of another symbol synchronization apparatus according to an embodiment of the present disclosure.

FIG. 7 is a schematic structural diagram of another symbol synchronization apparatus according to an embodiment of the present disclosure. Referring to FIG. 7, the symbol synchronization apparatus 30 includes a first processor 30-1, a first interpolation filter 30-3, and a loop filter 30-2.

The first processor 30-1 has the functions of the timing error estimation unit 20-1a and the interpolation control unit 20-1c shown in FIG. 3 to FIG. 6 above. The first interpolation filter 30-3 has the function of the first interpolation filter unit 20-1d shown in FIG. 3 to FIG. 6 above.

The loop filter 30-2 has the function of the loop filter unit 20-1b shown in FIG. 3 to FIG. 6 above.

Referring to FIG. 7, the symbol synchronization apparatus 30 further includes a second processor 30-4 and a second interpolation filter 30-5.

The second interpolation filter 30-5 has the function of the second interpolation filter unit 20-2b shown in FIG. 3 to FIG. 6 above. The second processor 30-4 has the function of the timing location adjustment unit 20-2a shown in FIG. 3 to FIG. 6 above.

Optionally, the second processor 30-4 may further have the function of the demodulation module 20-3 shown in FIG. 5 or FIG. 7 above.

Further, the first processor 30-3 and the second processor 30-4 may be integrated on one processor.

Figure 8:
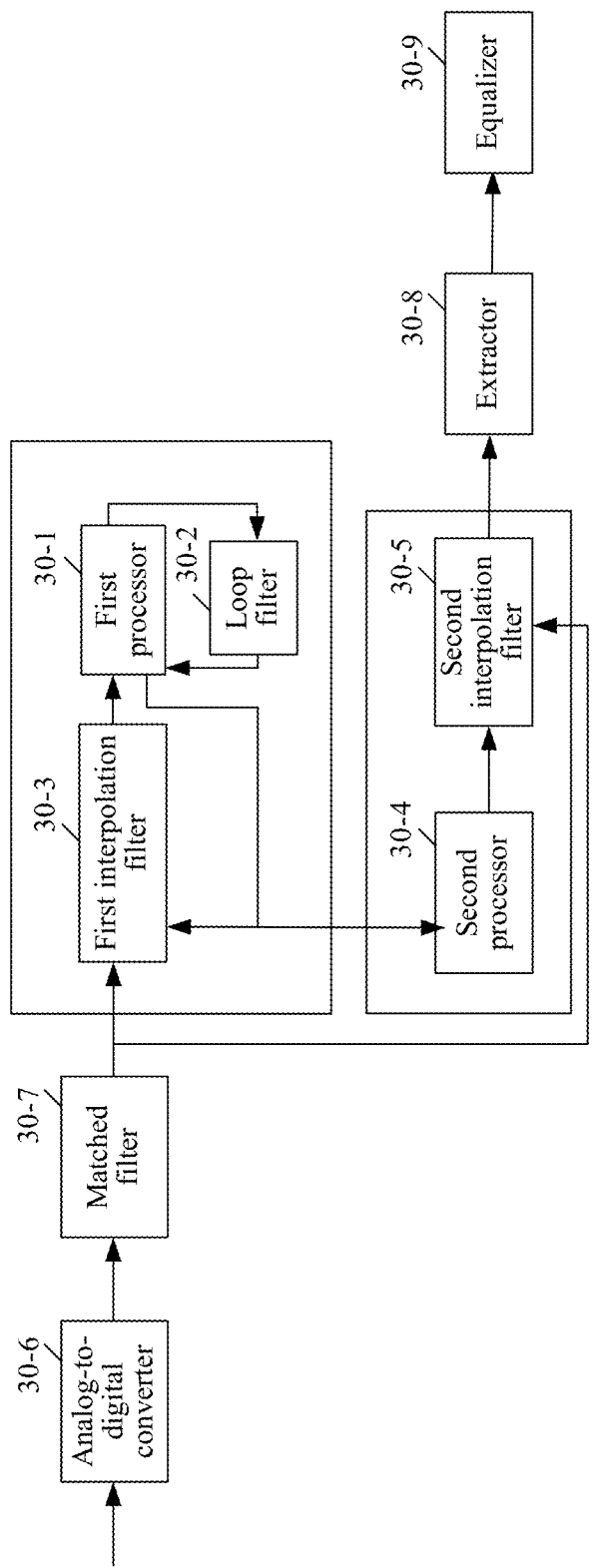
FIG. 8 is a schematic structural diagram of another receive end device according to an embodiment of the present disclosure.

Based on FIG. 7, FIG. 8 is a schematic structural diagram of another receive end device according to an embodiment of the present disclosure. Referring to FIG. 8, the receive end device further includes: an analog-to-digital converter 30-6, a matched filter 30-7, an extractor 30-8, and an equalizer 30-9.

The analog-to-digital converter 30-6 has the function of the analog-to-digital conversion module 21 shown in FIG. 6 above. The matched filter 30-7 has the function of the matched filter unit 22 shown in FIG. 6 above. The extractor 30-8 has the function of the extraction unit 23 shown in FIG. 6 above. The equalizer 30-9 has the function of the equalization module 24 shown in FIG. 6 above.

Figure 9:
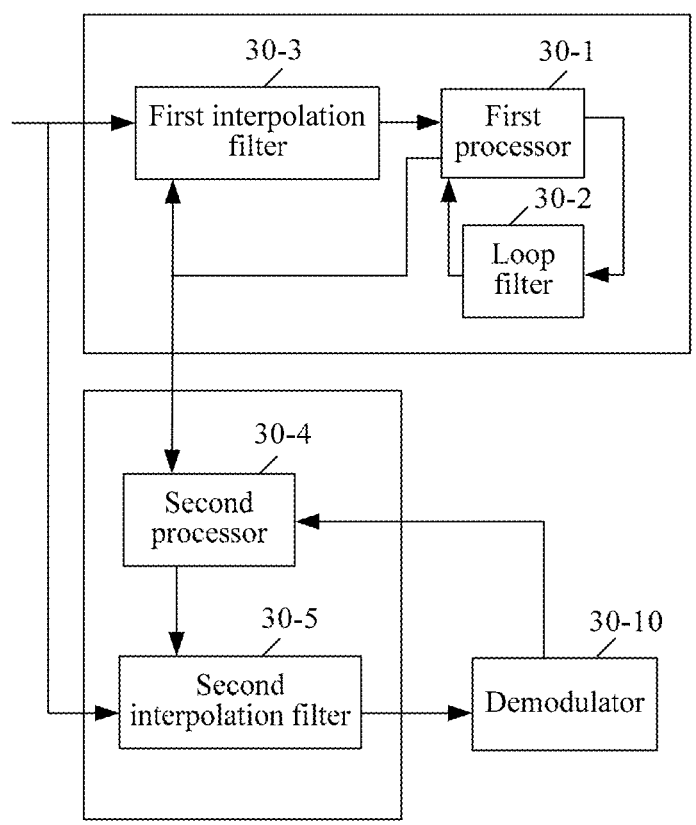
FIG. 9 is a schematic structural diagram of another symbol synchronization apparatus according to an embodiment of the present disclosure.

Based on FIG. 7, FIG. 9 is a schematic structural diagram of another symbol synchronization apparatus according to an embodiment of the present disclosure. Referring to FIG. 9, the symbol synchronization apparatus 30 further includes a demodulator 30-10.

The demodulator 30-10 has the function of the demodulation module 20-3 shown in FIG. 4 to FIG. 6 above.

Figure 10:
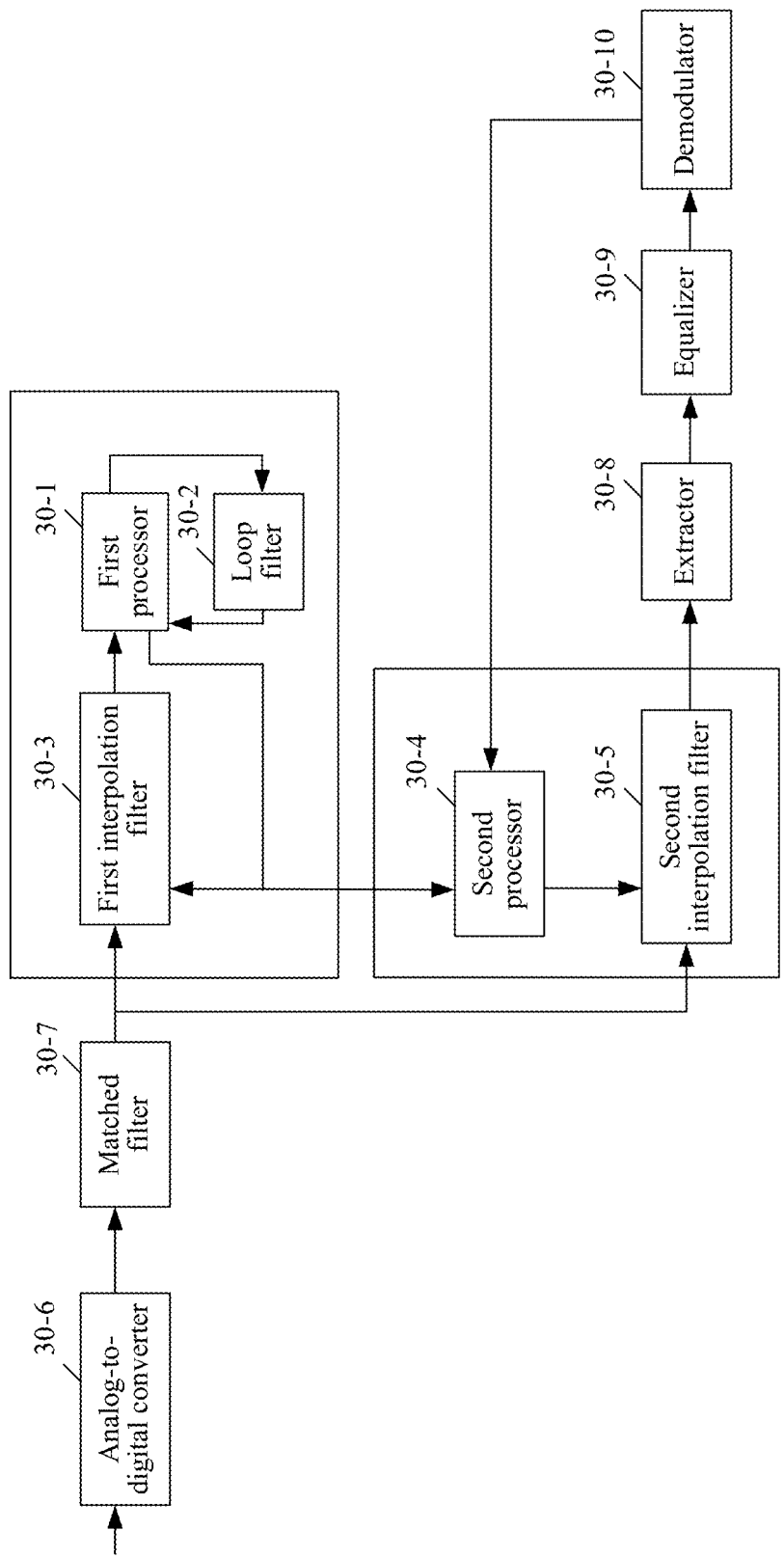
FIG. 10 is a schematic structural diagram of another receive end device according to an embodiment of the present disclosure.

Based on FIG. 8, FIG. 10 is a schematic structural diagram of another receive end device according to an embodiment of the present disclosure. The demodulator 30-10 may further have a connection relationship shown in FIG. 10.

Each module and device shown in FIG. 3 to FIG. 10 may be implemented by using a physical device, or may be implemented in a manner of a digital baseband. The physical entity is, for example, a field programmable gate array (FPGA), a complex programmable logic device (CPLD), and a digital signal processor (DSP).

Figure 11:
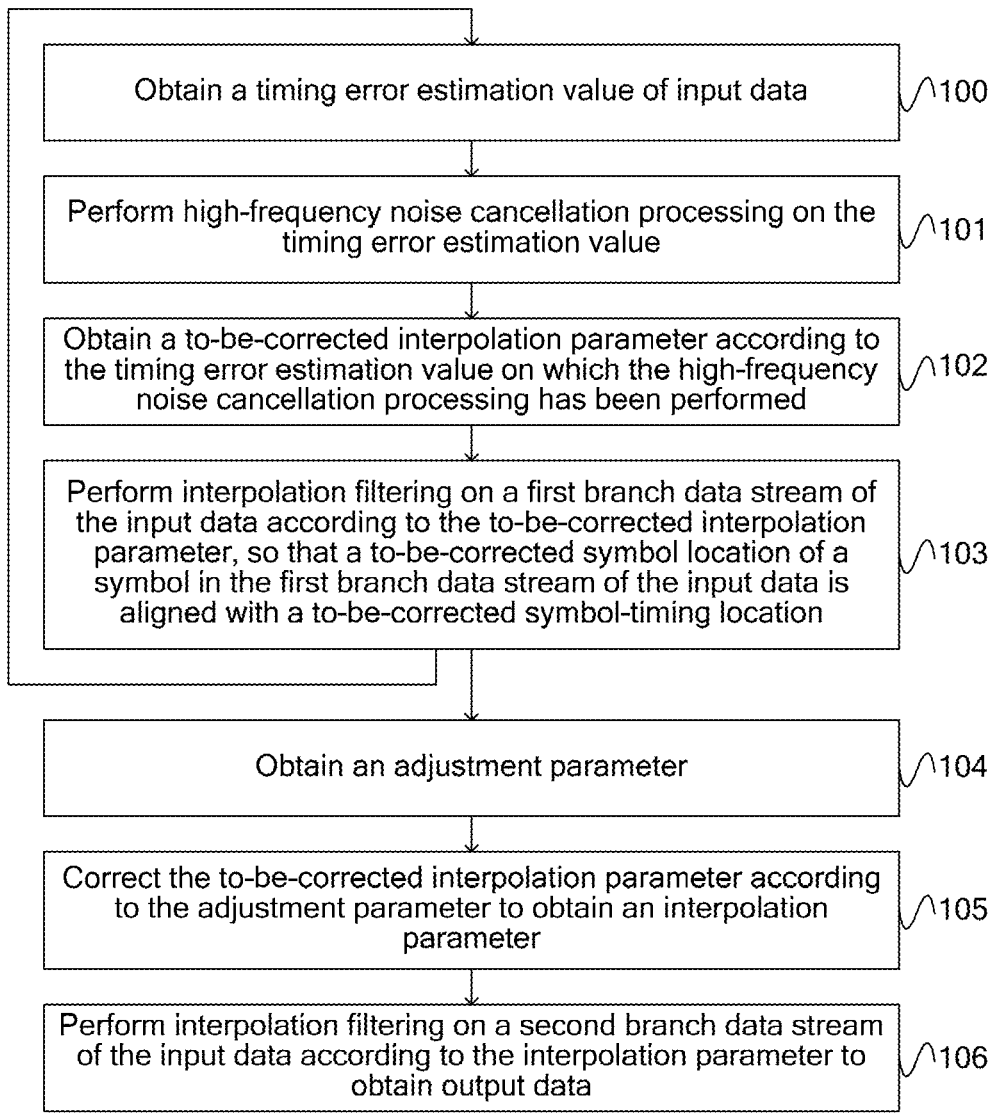
FIG. 11 is a schematic flowchart of a symbol synchronization method according to an embodiment of the present disclosure.

FIG. 11 is a schematic flowchart of a symbol synchronization method according to an embodiment of the present disclosure. The method is executed by the symbol synchronization apparatus shown in FIG. 3 to FIG. 10. Referring to FIG. 11, the method includes the following steps.

Step 100: Obtain a timing error estimation value of input data.

The timing error estimation value indicates a timing error of the input data.

Step 101: Perform high-frequency noise cancellation processing on the timing error estimation value.

Step 102: Obtain a to-be-corrected interpolation parameter according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location.

Step 103: Perform interpolation filtering on a first branch data stream of the input data according to the to-be-corrected interpolation parameter, so that a to-be-corrected symbol location of a symbol in the first branch data stream of the input data is aligned with the to-be-corrected symbol-synchronization location.

It should be noted that step 100 to step 103 may be executed repeatedly. After step 103 is executed, the process may continue to return to execute step 100.

Step 104: Obtain an adjustment parameter, where the adjustment parameter is used to correct an error of the to-be-corrected interpolation parameter.

Step 105: Correct the to-be-corrected interpolation parameter according to the adjustment parameter to obtain an interpolation parameter, where the interpolation parameter corresponds to an expected symbol-synchronization location.

Step 106: Perform interpolation filtering on a second branch data stream of the input data according to the interpolation parameter to obtain output data, where an expected symbol location of a symbol of the output data is aligned with the expected symbol-synchronization location.

According to the symbol synchronization method provided in this embodiment of the present disclosure, a timing error estimation value of input data is obtained, where the timing error estimation value indicates a timing error of the input data; high-frequency noise cancellation processing is performed on the timing error estimation value; a to-be-corrected interpolation parameter is obtained according to the timing error estimation value on which the high-frequency noise cancellation processing has been performed, where the to-be-corrected interpolation parameter is used as an input amount of interpolation filtering performed on the input data, and the to-be-corrected interpolation parameter corresponds to a to-be-corrected symbol-synchronization location; interpolation filtering is performed on a first branch data stream of the input data according to the to-be-corrected interpolation parameter, so that a to-be-corrected symbol location of a symbol in the first branch data stream of the input data is aligned with the to-be-corrected symbol-synchronization location; an adjustment parameter is obtained, where the adjustment parameter is used to correct an error of the to-be-corrected interpolation parameter; the to-be-corrected interpolation parameter is corrected according to the adjustment parameter to obtain an interpolation parameter, where the interpolation parameter corresponds to an expected symbol-synchronization location; and interpolation filtering is performed on a second branch data stream of the input data according to the interpolation parameter to obtain output data, where an expected symbol location of a symbol of the output data is aligned with the expected symbol-synchronization location. Therefore, the expected symbol location of the symbol of the output data is aligned with the expected symbol-synchronization location, so that in a scenario in which multiple signals are superimposed, impact of an error of a timing location on symbol synchronization is eliminated by correcting the timing location, and positioning accuracy of a symbol-synchronization location is improved.

Further, compared with the foregoing solution in the prior art, for a scenario in which multiple signals are superimposed, by using the method provided in this embodiment of the present disclosure, no additional hardware design is needed to correct a timing error, so that a design cost of hardware is reduced. Moreover, no additional module is needed to correct a timing error by using a manner of fractionally spaced equalization, thereby saving logical development resources.

Further, the to-be-corrected interpolation parameter includes a first symbol indicator ce_2X and a first interpolation phase ph.

First symbol indicator ce_2X is used to: identify, at a high order, a sampling point of the symbol in the first branch data stream of the input data and a sampling point between every two symbols in the first branch data stream of the input data; and identify, at a low order, a sampling point other than the sampling point of the symbol in the first branch data stream of the input data and the sampling point between every two symbols in the first branch data stream of the input data.

First interpolation phase ph is used as an input amount of interpolation filtering performed on the first branch data stream of the input data, so that the to-be-corrected symbol-synchronization location is aligned with the to-be-corrected symbol location of the symbol in the first branch data stream of the input data, and a value range of ph is [0,1].

When ce_2X is at a high order, ph changes gradually by an equal amount; or when ce_2X is at a low order, ph remains unchanged.

Figure 12:
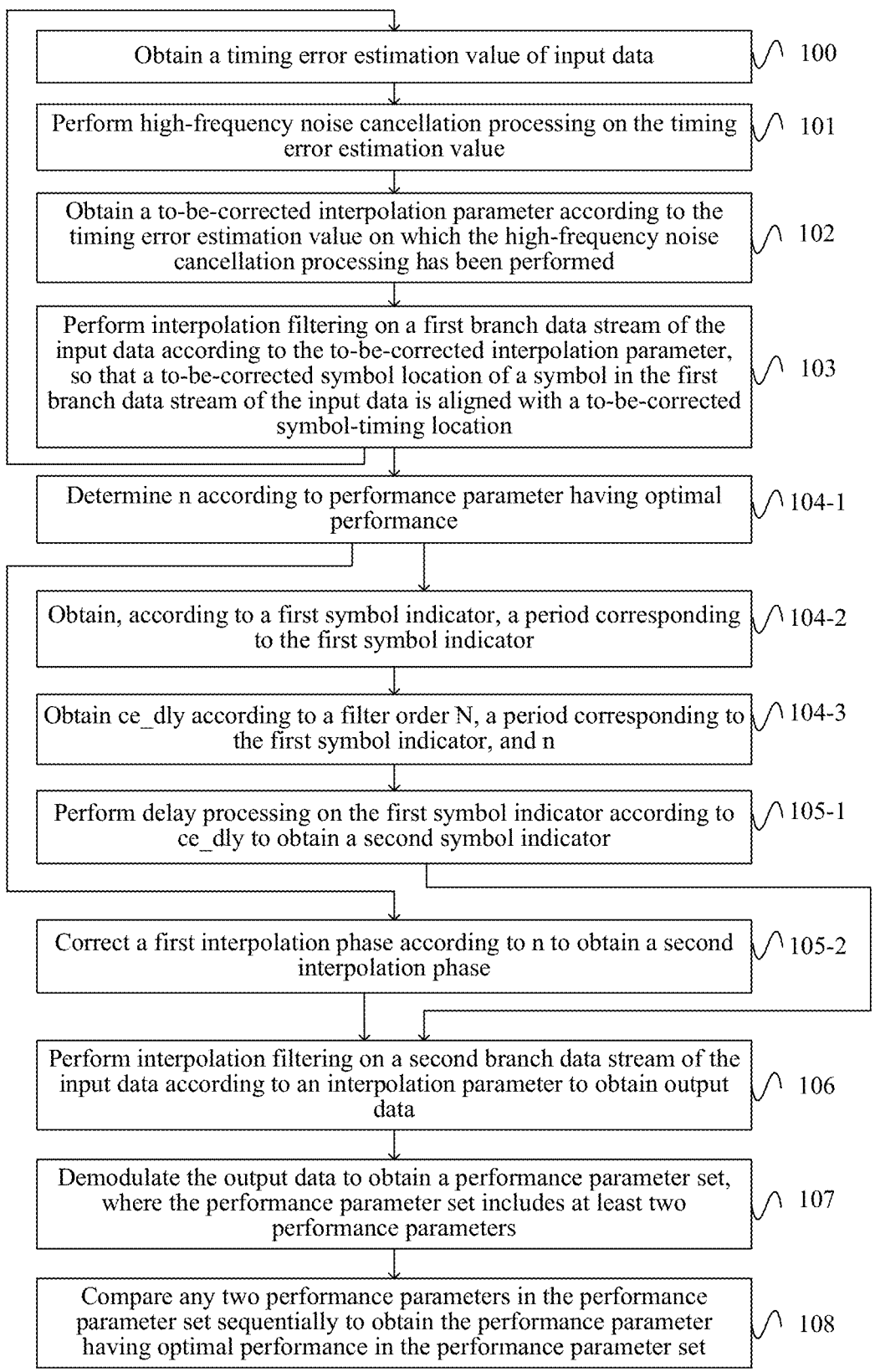
FIG. 12 is a schematic flowchart of another symbol synchronization method according to an embodiment of the present disclosure.

Based on FIG. 11, FIG. 12 is a schematic flowchart of another symbol synchronization method according to an embodiment of the present disclosure. Referring to FIG. 12, the method further includes the following steps.

Step 107: Demodulate the output data to obtain a performance parameter set, where the performance parameter set includes at least two performance parameters.

Step 108: Compare any two performance parameters in the performance parameter set sequentially to obtain a performance parameter having optimal performance in the performance parameter set, where the performance parameter having optimal performance corresponds to the expected symbol-synchronization location.

Optionally, the adjustment parameter includes an adjustment amount n and a delay-enabling amount ce_dly.

Based on step 107 and step 108, a possible implementation manner of step 104 is:

Step 104-1: Determine n according to the performance parameter having optimal performance.

Step 104-2: Obtain, according to the first symbol indicator, a period $T_{ce}$ corresponding to the first symbol indicator.

Step 104-3: Obtain ce_dly according to a filter order N, $T_{ce}$, and n.

Specifically, ce_dly is obtained according to the filter order, $T_{ce}$, and n, where ce_dly satisfies the following formula:

$$\text{ce\_dly} = T_{ce} - \text{round}\left(\frac{n}{N/T_{ce}}\right),$$

where a value range of n is $1 \leq n \leq N$.

Correspondingly, a possible implementation manner of step 105 is:

Step 105-1: Perform delay processing on the first symbol indicator according to ce_dly to obtain a second symbol indicator.

Step 105-2: Correct the first interpolation phase according to n to obtain the second interpolation phase.

Optionally, an obtaining manner of $T_{ce}$ is: obtaining, according to the first symbol indicator, a period corresponding to the first symbol indicator.

Specifically, a waveform of ce_2X has a period $T_{ce}$. A value of the period $T_{ce}$ may be obtained by means of values of $f_s$ and $2f_{sym}$, and is a value of a numerator of $$\frac{f_s}{2f_{sym}}$$

when the numerator and a denominator of $$\frac{f_s}{2f_{sym}}$$

are both integers and are both irreducible (having no common divisor). For example, $f_s$=100 M, and $f_{sym}$=49.5 M, so that $T_{ce}$=100. For another example, $f_s$=100 M, and $f_{sym}$=45 M, so that $T_{ce}$=10.

The adjustment amount n is generated according to the expected symbol-synchronization location, and the value range of n is $1 \leq n \leq N$.

The second symbol indicator is used to: identify, at a high order, a sampling point of a symbol in the second branch data stream of the input data and a sampling point between every two symbols in the second branch data stream of the input data; and identify, at a low order, a sampling point other than the sampling point of the symbol in the second branch data stream of the input data and the sampling point between every two symbols in the second branch data stream of the input data.

The second interpolation phase is used as an input amount of interpolation filtering performed on the second branch data stream of the input data; and a value range of the second interpolation phase is [0,1].

When the second symbol indicator is at a high order, the second interpolation phase changes gradually by an equal amount; or when the second symbol indicator is at a low order, the second interpolation phase remains unchanged.

Further, referring to FIG. 11, for step 105, a possible implementation manner is: A function of the timing location adjustment unit 20-2a specifically includes: extracting $T_{ce}$, and adjusting the first interpolation phase ph according to the adjustment amount n input externally. A second interpolation phase ph_2 is obtained after adjustment based on ph, and 0-to-1-wrap-processing needs to be performed on ph_2. Wrap (0,1) means that +1*N or −1*N is performed on input data to keep output data in an interval [0,1]. For example, the input data is: 1.2, 3.1, −0.8, and after wrap (0,1) is performed, the output data is: 0.2, 0.1, 0.2. After the wrap processing, a value range of ph_2 satisfies 0≤ph_2<1, a search value m is determined according to ph_2, a same two-dimensional lookup table is looked up according to the search value m to obtain N, and ce_2X is correspondingly moved according to ce_dly to obtain ce_2X_2. Adjustment objects of the timing location adjustment unit 20-2a are output parameters ph and ce_2X of the interpolation control unit 20-1c, and adjustment values of the timing location are the adjustment amount n and ce_dly.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A symbol synchronization method, comprising:
   obtaining a timing error estimation value of input data indicating a timing error of the input data;
   performing high-frequency noise cancellation processing on the timing error estimation value;
   obtaining a to-be-corrected interpolation parameter according to the timing error estimation value on which the high-frequency noise cancellation processing has been performed, wherein the to-be-corrected interpolation parameter corresponds to a to-be-corrected symbol-synchronization location;

performing interpolation filtering on a first branch data stream of the input data according to the to-be-corrected interpolation parameter for aligning a to-be-corrected symbol location of a symbol in the first branch data stream of the input data with the to-be-corrected symbol-synchronization location;

obtaining an adjustment parameter;

correcting the to-be-corrected interpolation parameter according to the adjustment parameter to obtain an interpolation parameter, wherein the interpolation parameter corresponds to an expected symbol-synchronization location; and performing interpolation filtering on a second branch data stream of the input data according to the interpolation parameter to obtain output data, wherein an expected symbol location of a symbol of the output data is aligned with the expected symbol-synchronization location.

2. The method according to claim 1, wherein:

the to-be-corrected interpolation parameter comprises a first symbol indicator and a first interpolation phase;

the first symbol indicator is used to:
identify, at a high order, a sampling point of the symbol in the first branch data stream of the input data and a sampling point between every two symbols in the first branch data stream of the input data, and
identify, at a low order, a sampling point other than the sampling point of the symbol in the first branch data stream of the input data and the sampling point between every two symbols in the first branch data stream of the input data;

the first interpolation phase is used as an input amount of interpolation filtering performed on the first branch data stream of the input data for aligning the to-be-corrected symbol-synchronization location with the to-be-corrected symbol location of the symbol in the first branch data stream of the input data, and wherein a value range of the first interpolation phase is [0, 1]; and when the first symbol indicator is at a high order, the first interpolation phase changes gradually by an equal amount, or when the first symbol indicator is at a low order, the first interpolation phase remains unchanged.

3. The method according to claim 2, further comprising:

demodulating the output data to obtain a performance parameter set comprising at least two performance parameters; and comparing any two performance parameters in the performance parameter set sequentially to obtain a performance parameter having optimal performance in the performance parameter set, wherein the performance parameter having optimal performance corresponds to the expected symbol-synchronization location;

wherein the adjustment parameter comprises an adjustment amount n and a delay-enabling amount ce_dly; and wherein obtaining an adjustment parameter comprises:
determining n according to the performance parameter having optimal performance,
obtaining, according to the first symbol indicator, a period $T_{ce}$ corresponding to the first symbol indicator, and
obtaining ce_dly according to a filter order N, $T_{ce}$, and n, wherein ce_dly satisfies the following formula:

$$\text{ce\_dly} = T_{ce} - \text{round}\left(\frac{n}{N/T_{ce}}\right),$$

wherein a value range of n is 1≤n≤N.

4. The method according to claim 3, wherein:

the interpolation parameter comprises a second symbol indicator and a second interpolation phase, and a value range of the second interpolation phase is [0,1];

correcting the to-be-corrected interpolation parameter according to the adjustment parameter to obtain an interpolation parameter comprises:
performing delay processing on the first symbol indicator according to ce_dly to obtain the second symbol indicator, and
correcting the first interpolation phase according to n to obtain the second interpolation phase;

wherein the second symbol indicator is used to: identify, at a high order, a sampling point of a symbol in the second branch data stream of the input data and a sampling point between every two symbols in the second branch data stream of the input data; and identify, at a low order, a sampling point other than the sampling point of the symbol in the second branch data stream of the input data and the sampling point between every two symbols in the second branch data stream of the input data;

wherein the second interpolation phase is used as an input amount of interpolation filtering performed on the second branch data stream of the input data; and when the second symbol indicator is at a high order, the second interpolation phase changes gradually by an equal amount; or when the second symbol indicator is at a low order, the second interpolation phase remains unchanged.

5. A symbol synchronization apparatus, comprising:

a first processor configured to obtain a timing error estimation value of input data for indicating a timing error of the input data;

a loop filter is configured to perform high-frequency noise cancellation processing on the timing error estimation value;

wherein the first processor is further configured to obtain a to-be-corrected interpolation parameter according to the timing error estimation value on which the high-frequency noise cancellation processing has been performed, wherein the to-be-corrected interpolation parameter corresponds to a to-be-corrected symbol-synchronization location; and a first interpolation filter configured to perform interpolation filtering on a first branch data stream of the input data according to the to-be-corrected interpolation parameter for aligning a to-be-corrected symbol location of a symbol in the first branch data stream of the input data with the to-be-corrected symbol-synchronization location;

a second processor is configured to:
obtain an adjustment parameter, and
correct the to-be-corrected interpolation parameter according to the adjustment parameter to obtain an interpolation parameter, wherein the interpolation parameter corresponds to an expected symbol-synchronization location; and a second interpolation filter configured to perform interpolation filtering on a second branch data stream of the input data according to the interpolation parameter to obtain output data, wherein an expected symbol location of a symbol of the output data is aligned with the expected symbol-synchronization location.

6. The apparatus according to claim 5, wherein:
the to-be-corrected interpolation parameter comprises a first symbol indicator and a first interpolation phase;
the first symbol indicator is used to:
- identify, at a high order, a sampling point of the symbol in the first branch data stream of the input data and a sampling point between every two symbols in the first branch data stream of the input data, and
- identify, at a low order, a sampling point other than the sampling point of the symbol in the first branch data stream of the input data and the sampling point between every two symbols in the first branch data stream of the input data;

the first interpolation phase is used as an input amount of interpolation filtering performed on the first branch data stream of the input data for aligning with the to-be-corrected symbol location of the symbol in the first branch data stream of the input data, and wherein a value range of the first interpolation phase is [0,1]; and
when the first symbol indicator is at a high order, the first interpolation phase changes gradually by an equal amount, or when the first symbol indicator is at a low order, the first interpolation phase remains unchanged.

7. The apparatus according to claim 6, wherein:
the second processor is further configured to:
- demodulate the output data to obtain a performance parameter set, wherein the performance parameter set comprises at least two performance parameters,
- compare any two performance parameters in the performance parameter set sequentially to obtain a performance parameter having optimal performance in the performance parameter set, wherein the performance parameter having optimal performance corresponds to the expected symbol-synchronization location, wherein the adjustment parameter comprises an adjustment amount n and a delay-enabling amount ce_dly, and
- determine n according to the performance parameter having optimal performance; and to obtain the adjustment parameter, the second processor is configured to:
- receive n sent by the demodulation module;
- obtain, according to the first symbol indicator, a period $T_{ce}$ corresponding to the first symbol indicator, and
- obtaining ce_dly according to a filter order N, $T_{ce}$, and n, wherein ce_dly satisfies the following formula:

$$ce\_dly = T_{ce} - \text{round}\left(\frac{n}{N/T_{ce}}\right),$$

wherein a value range of n is 1≤n≤N.

8. The apparatus according to claim 7, wherein:
the interpolation parameter comprises a second symbol indicator and a second interpolation phase, and a value range of the second interpolation phase is [0,1];
to correct the to-be-corrected interpolation parameter according to the adjustment parameter to obtain an interpolation parameter, the second processor is configured to:
- perform delay processing on the first symbol indicator according to ce_dly to obtain the second symbol indicator, and
- correct the first interpolation phase according to n to obtain the second interpolation phase;

the second symbol indicator is used to:
- identify, at a high order, a sampling point of a symbol in the second branch data stream of the input data and a sampling point between every two symbols in the second branch data stream of the input data, and
- identify, at a low order, a sampling point other than the sampling point of the symbol in the second branch data stream of the input data and the sampling point between every two symbols in the second branch data stream of the input data;

the second interpolation phase is used as an input amount of interpolation filtering performed on the second branch data stream of the input data; and
when the second symbol indicator is at a high order, the second interpolation phase changes gradually by an equal amount, or when the second symbol indicator is at a low order, the second interpolation phase remains unchanged.

9. The apparatus according to claim 5, wherein the first processor and the second processor are integrated on one processor.

* * * * *